Oct. 30, 1962 W. EBBINGE 3,061,792
TRANSISTORIZED RECEIVING CIRCUIT ARRANGEMENT
Filed Dec. 10, 1958
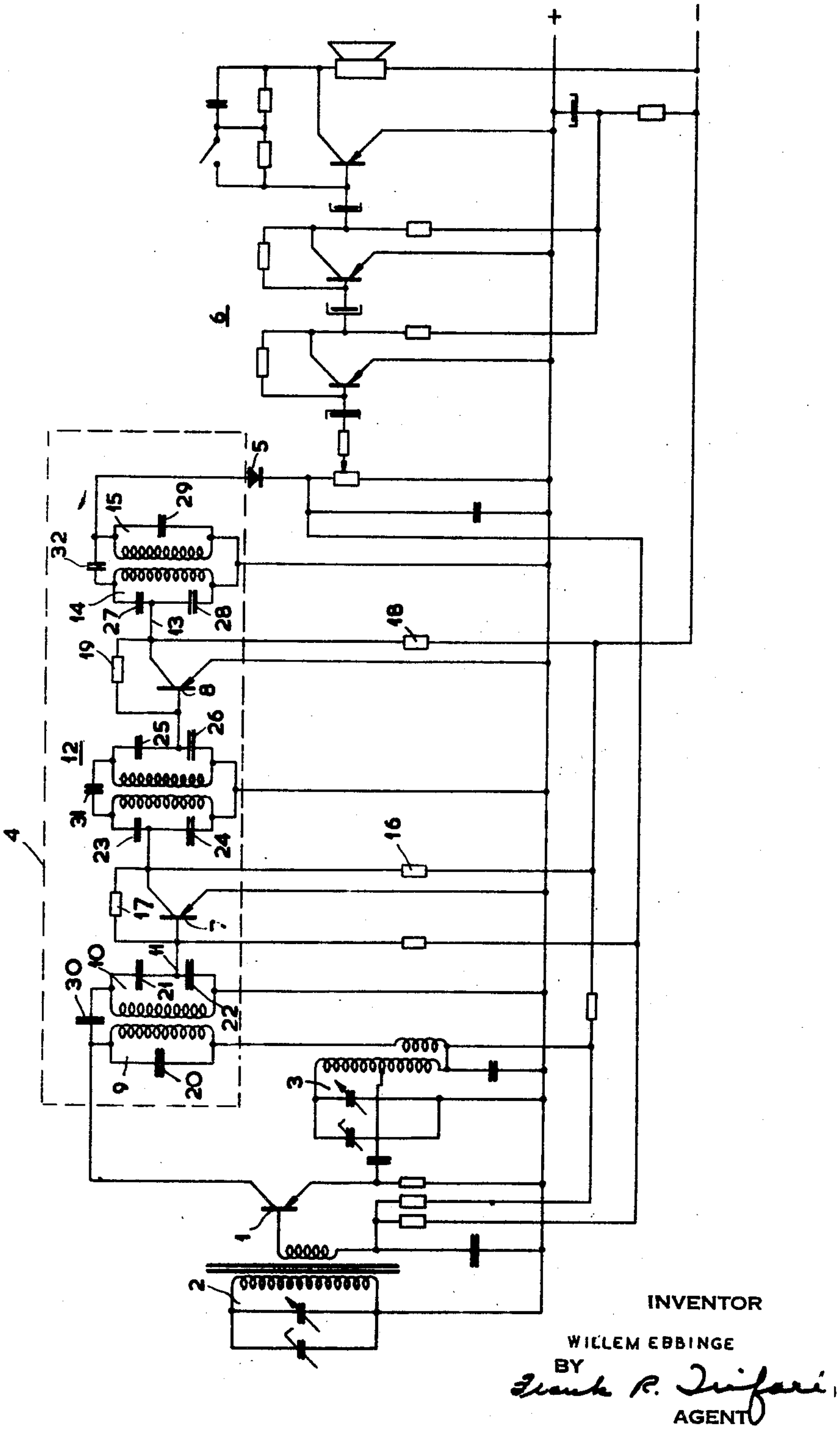
INVENTOR
WILLEM EBBINGE
BY Frank R.
AGENT United States Patent Office
3,061,792
Patented Oct. 30, 1962

3,061,792

TRANSISTORIZED RECEIVING CIRCUIT ARRANGEMENT

Willem Ebbinge, Eindhoven, Netherlands, assignor to North American Philips Company, Inc., New York, N.Y., a corporation of Delaware Filed Dec. 10, 1958, Ser. No. 779,367
Claims priority, application Germany Jan. 7, 1958
3 Claims. (Cl. 330—21)

The present invention relates to receiving circuit arrangements comprising an intermediate-frequency transistor amplifier operated in common emitter arrangement, which follows a mixing stage, preferably a self-oscillating mixing stage, and is followed by a detector stage. In such circuit arrangements, the difficulty is experienced that the intermediate-frequency amplifier is required to be re-set after the exchanging of any of its transistors; this is due to spreading of the characteristic factors of the transistor. In particular, the transistors have a comparatively high capacitance between the collector and the base. This capacitance can be compensated for by means of a neutralizing arrangement, but such circuit arrangements are comparatively expensive and not sufficiently reliable, since exchange of the transistors requires re-adjustment of the neutralization.

The present invention has for its object to provide a circuit arrangement in which the need for neutralization is obviated. It is characterized in that the mixing stage is connected to the primary circuit of comparatively low Q factor of an intermediate-frequency input band-pass filter, the secondary circuit of which has a comparatively high Q and comprises a tapping having a low tapping ratio, which tapping is connected to the base of the (first) intermediate-frequency transistor; in addition, the collector of the (last) intermediate-frequency transistor is connected to a tapping having a low tapping ratio of the primary circuit of comparatively high Q of an intermediate-frequency output band-pass filter, whose secondary circuit, connected to the detector, has a comparatively low Q; the operating point stabilization of the intermediate-frequency transistor(s) is effected in known manner by means of a collector resistor together with a collector-base resistor, which resistors preferably have such values that the voltage drop across the collector resistor corresponds to approximately half the supply voltage.

In order that the invention may be readily carried into effect, an example will now be described in detail with reference to the accompanying drawing.

The receiving circuit arrangement includes a first transistor 1 connected to an antenna circuit 2 and arranged as a self-oscillating mixing stage through feedback across a circuit 3. The produced intermediate-frequency oscillations are amplified in an intermediate-frequency amplifier 4, subsequently rectified by means of a detector 5 and supplied to a low-frequency stage 6.

The intermediate-frequency amplifier 4 comprises transistors 7 and 8 which are operated in common emitter-arrangement and are coupled together and to the mixing stage 1 and to the detector stage 5 through band-pass filters. The input band-pass filter of the intermediate-frequency amplifier 4 comprises a primary resonant circuit 9 having only a comparatively low Q factor, for example 30. The secondary circuit 10 of this input band-pass filter has, however, a comparatively high Q, for example 120, and is tapped capacitatively. The tapping 11 leads to the base of the transistor 7, whose collector is connected to the tapping of the primary circuit of another band-pass filter 12 having a Q factor of 120. A tapping on the secondary circuit of this band-pass filter 12 is connected to the base of the transistor 8, the collector of which is connected to the tapping 13 of the primary circuit 14 of the output band-pass filter of the amplifier 4. This primary circuit also has a high Q, for example 120. The secondary circuit 15 of the output band-pass filter has, however, a low Q, for example 20, and is directly connected to the detector stage 5. The Q factors of the resonant circuits as represented, provided they are not connected to the transistors, are approximately 150.

The tapping ratios of the circuits 10 and 14 and that of the band-pass filter 12 respectively are all comparatively low, at least less than 0.2 and preferably between 0.02 and 0.07. In this manner, mismatching between the circuits and the transistors occurs in such a sense that the circuits have too low an impedance in proportion to the internal transistor input impedance, but it is found that the reliability of the circuit arrangement is thus considerably improved without appreciably detracting from the power amplification and the properties with regard to the bandwidth. For this purpose, however, the required operating point stabilization should not, as is customary, be effected by means of an emitter-resistor, but the transistors 7 and 8 should be equipped with collector-resistors 16, 18 respectively and collector-base resistors 17, 19 respectively, which yield operating point stabilization in known manner. As a matter of fact, the use of an emitter-resistor stabilizes the collector current so that the input impedance, when exchanging the transistors, spreads about proportionally to the collector-base-current amplification factor. The present stabilization, however, reduces the spreading of the input impedance and of the output impedance of the transistors.

The resistors 16 to 19 are, in particular, proportioned so that approximately half the supply voltage across the resistors 16 to 18 respectively is lost, so that the resistors 17 and 19 should exceed the resistors 16 and 19 respectively by approximately the collector-base current amplification factor of the transistors 7 and 8 respectively.

In a practical example, the capacitors 20 to 29 had the following values: 195 $\mu\mu$f., 110 $\mu\mu$f., 4700 $\mu\mu$f., 110 $\mu\mu$f., 1800 $\mu\mu$f., 195 $\mu\mu$f., 3300 $\mu\mu$f., 110 $\mu\mu$f., 1800 $\mu\mu$f. and 195 $\mu\mu$f. Trimmer capacitors 30, 31 and 32 of 2.2 $\mu\mu$f., 0.8 $\mu\mu$f. and 2.2 $\mu\mu$f. respectively were provided for trimming the band-pass filter coupling. The resistors 16 to 19 had the following values: 6.8 kΩ, 330 kΩ, 6.8 kΩ and 330 kΩ respectively. The tapping ratio of the secondary circuit of the input intermediate-frequency transformer was consequently $$\frac{100\ \mu\mu\text{f.}}{4700\ \mu\mu\text{f.}}=0.023$$

that of the primary circuit of the output transformer $$\frac{110\ \mu\mu\text{f.}}{1800\ \mu\mu\text{f.}}=0.061$$

Alternatively, inductive tapping of the circuits of the intermediate-frequency band-pass filters may be effected. In this case, however, more switching elements are required. As a further alternative, if necessary, a greater or smaller number of transistors may be used in the intermediate-frequency amplifier.

What is claimed is:

1. An intermediate-frequency transistor amplifier comprising a plurality of band-pass filters and transistors, alternately connected in cascade, means for applying an input signal to the first of said band-pass filters, said first filter comprising a primary circuit and a secondary circuit coupled to said primary circuit, said primary circuit having a Q factor which is low compared to the Q factor of the secondary circuit, said secondary circuit including a tapping point having a tapping ratio below the value of 0.2, means connecting said tapping point to the base of the first transistor, the collector of the last transistor of the cascade being connected to a tapping point of the primary circuit of the last band-pass filter of the cascade, said tapping point having a tapping ratio below the value of 0.2, said primary circuit being coupled to a secondary circuit, said primary circuit having a Q factor which is low compared to the Q factor of the secondary circuit, each transistor being operated in common-emitter arrangement and having its operating point stabilized by means of a first resistor connected in the collector circuit and a second resistor connected between the collector and the base of the transistor.

2. A transistor amplifier as claimed in claim 1, wherein said tappings are capacitative.

3. A circuit arrangement as claimed in claim 1, wherein said tappings are inductive.

References Cited in the file of this patent

UNITED STATES PATENTS 2,931,988 Bussard ---------------- Apr. 5, 1960

OTHER REFERENCES

Article: "Series Tuned Methods in Transistor Radio Circuitry," by Chow and Paynter; IRE Transactions on Circuit Theory, September 1957, pages 174 to 178, of which only page 174 is cited.

Article: "An Experimental Automobile Receiver Employing Transistors," by Freedman, Stanley, and Holmes; Proceedings of the IRE, June 1955, pages 671 to 678.

Book: "Transistor Electronics," by Lo, Enders, Zawels, Waldhauer, and Cheng; Prentice Hall, 1955, pages 134, 135.